Oct. 31, 1950        A. BECHLER        2,528,330
CONVEYER FOR SCREWS TO BE SLITTED IN AUTOMATIC LATHES
Filed May 8, 1946
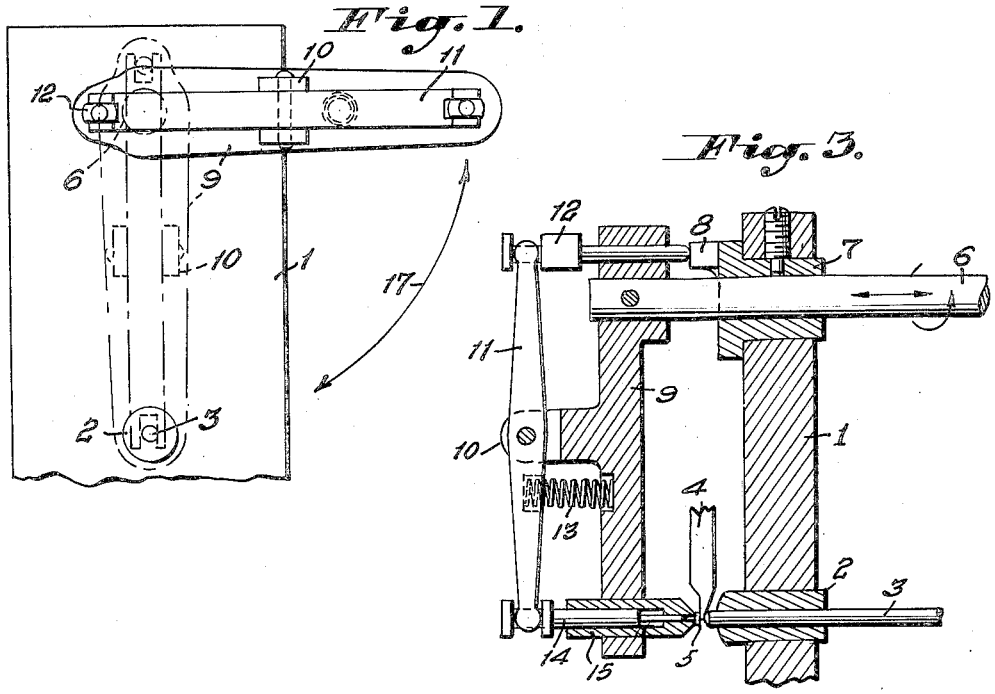
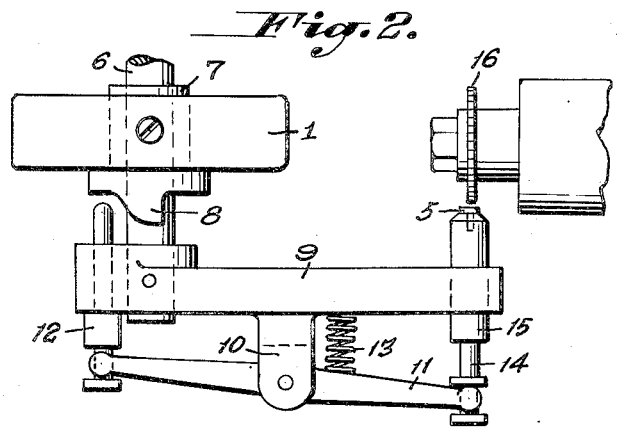
INVENTOR.
André Bechler
BY
Attorneys.

Patented Oct. 31, 1950

2,528,330

UNITED STATES PATENT OFFICE 2,528,330

CONVEYER FOR SCREWS TO BE SLITTED IN AUTOMATIC LATHES

André Bechler, Moutier, Switzerland

Application May 8, 1946, Serial No. 668,037
In Switzerland March 12, 1946

2 Claims. (Cl. 10—5)

The conveyer for screws to be slitted in automatic lathes according to the invention is of the type comprising a suction piston to maintain the screw in place, at a certain moment in the cycle of operations, on the conveying arm. It is characterised by the fact that the action of the piston is controlled, under the constraint of a spring, by a cam concentric to the controlling rod of the conveying lever. This arrangement simplifies the apparatus and disposes of all accessory parts hitherto in use in conveyers of this kind for the control of the suction piston in question.

The attached drawing shows, by way of example and to the extent only to render the following description intelligible, a conveyer for screws to be slitted according to the present invention.

Fig. 1 shows an elevational view of a conveyer;

Fig. 2 is a plan view of the same and

Fig. 3 is an axial section in the position of operation at the moment when the screw is gripped by its shank after having been turned from the bar of work.

In the drawing, a support of the lathe is denoted by 1, which carries a sleeve 2, through which the bar 3 passes and is worked upon at its extremity by a tool 4 which, when the shank of the screw 5 has been turned and threaded, detaches it from the bar. At the end of this operation, the parts occupy the relative positions represented in Figure 3 of the drawing.

In addition, the support 1 carries a sleeve 7 with cam tube 8 disposed concentrically with respect to the rod 6 pivoted in the said sleeve. This rod can be both alternately rotated periodically through 90° and displaced axially in the sleeve 7. It carries at its free end an arm 9 pinned to it, which extends beyond the axis of turning, with a support 10 at the center of this arm, in which a lever 11 is pivoted. A plunger 12 is articulated at the end of one of the arms of this lever. The plunger passes through the arm 9 and its free end co-operates with the cam-lobe 8, against which it constantly bears, under the constraint of a spring 13 held between the support 9 and one of the arms of the lever 11.

The arm of the lever 11 opposite to the one co-operating with the plunger 12 is articulated on a piston 14 adjusted within the cylinder 15 carried by the arm 9 and whose axis coincides with that of the work in the position of operation shown in Fig. 3, i. e. at the moment when the end of the cylinder has gripped the shank of the screw which is about to be detached from the bar.

The conveying device represented functions as follows:

When the shank of the screw has been threaded and at the moment when the screw is about to be detached from the bar, the arm 9 is brought into the position shown in Fig. 3 by the rotation of the rod 6. The axial displacement of the rod 6 causes the shank of the screw to be inserted in the end of the cylinder. The tool 4 then having done its work, the rod 6 is rotated by means not represented in the direction of the arrow head 17 in Fig. 1, bringing the head of the screw into the position shown in Fig. 2 in which the milling cutter 16 turns continually. At the beginning of the rotative movement of the arm 9 the plunger 12, under the constraint of the spring 13, leaves the cam-lobe 8 and the piston 4, under the constraint of the same spring, is forced out of the cylinder 15, creating a partial vacuum within the latter so as to keep the screw in place during the conveying operation.

The milling operation is done by a second axial displacement of the rod 6, which brings the head of the screw on to the standard cutter, then the screw is drawn away from the tool and the arm 9 is rotated in the contrary sense so as to bring the axis of the cylinder back into the axis of turning. During this latter operation, the plunger 12 slides on the upper surface of the cam-lobe 8 which actuates the piston 14, thus ejecting the finished screw. The cycle of operation recommences at this point. The arm 9 is displaced axially once more to enable the next screw-shank 5 to be inserted into the cylinder-end.

What I claim is:

1. In an automatic lathe, a screw detaching tool and a screw slitting tool, a support member on one side of said screw detaching tool, a bar-stock holder and a bearing carried by said support member in spaced relation to each other and having their axes in parallelism and extending perpendicular of said support member, a conveyer arm at the other side of said screw detaching tool, a screw holding cylinder carried by said arm and having its axis in parallelism to the axes of the bar-stock holder and the bearing, said arm being rotatable in two directions in a plane parallel to the plane of said support member to swing said cylinder from a position in front of said bar-stock holder to a position in front of said screw slitting tool and vice versa, a suction piston slidably disposed in said cylinder, a straightlined, double-armed control lever pivoted on said conveyer arm on the side thereof remote from said screw detaching tool, said lever in its neutral position being parallel with said arm and said support member and perpendicular with respect to the axes of said bearing and said bar-stock holder, one end of said lever being pivoted to said suction piston, an axially adjustable and rotatable control rod fixed to said conveyer arm and received in said bearing, cam means fixed to said support member concentrically of said control rod, a plunger having one end contactable with said cam means and disposed in parallelism with said piston and said rod, said plunger being slidably disposed in said conveyer arm and having its other end pivoted to the other end of said control lever, and resilient means extending between said arm and said lever for pivoting said lever and pressing said plunger into contact with said cam means.

2. In an automatic lathe as defined in and by claim 1 and said cam means being arranged on said bearing.

ANDRÉ BECHLER.

REFERENCES CITED

The following references are of record in the file of this patent:

UNITED STATES PATENTS

| Number | Name | Date |
| --- | --- | --- |
| 418,495 | Brooks | Dec. 31, 1889 |
| 623,036 | Richmond et al. | Apr. 11, 1899 |
| 703,121 | Davenport | June 24, 1902 |
| 1,218,987 | Drake | Mar. 13, 1917 |
| 1,355,296 | Winkley | Oct. 12, 1920 |
| 2,152,591 | Hanneman | Mar. 28, 1939 |
| 2,198,976 | Rober | Apr. 30, 1940 |